United States Patent [19]

Ohtake et al.

[11] Patent Number: 5,714,665
[45] Date of Patent: Feb. 3, 1998

[54] METHOD AND APPARATUS FOR THE DECOMPOSITION AND RE-USE-AS-RESOURCE TREATMENT OF OZONE LAYER-DEPLETING SUBSTANCES BY APPLICATION OF UV LIGHT

[75] Inventors: Kuninobu Ohtake; Takeshi Ohyama, both of Yokohama; Hisashi Sakai, Kyoto; Xing-zhe Zhao, Kyoto; Shigeru Morikawa, Kyoto, all of Japan

[73] Assignee: The Tokyo Electric Power Co., Inc., Tokyo, Japan

[21] Appl. No.: 394,007

[22] Filed: Feb. 23, 1995

[51] Int. Cl.$^6$ ............................... B01J 20/00
[52] U.S. Cl. ............ 588/204; 588/205; 204/157.15; 204/157.3; 422/186
[58] Field of Search ............... 204/157.15, 157.3; 588/204, 205; 422/186

[56] References Cited

U.S. PATENT DOCUMENTS 4,780,287  10/1988  Zeff et al. ............... 204/157.3
5,260,036  11/1993  Weigold et al. ............ 422/186.3

FOREIGN PATENT DOCUMENTS

5-227205  10/1993  Japan.
2243560   11/1991  United Kingdom ............ 204/157.3

Primary Examiner—Arun S. Phasge
Attorney, Agent, or Firm—Flynn, Thiel, Boutell & Tanis, P.C.

[57] ABSTRACT

A method for continuously decomposing ozone layer-depleting substances which comprises adding air serving as a photolytic reaction promoter to at least one member selected from the group consisting of CFCs, HCFCs, halons and halogen-containing organic solvents, subjecting the resultant mixture to irradiation with UV light, and separating the resultant solid product and the resultant halogen product from each other to render the at least one member harmless is described. The method comprises providing a refrigeration medium comprising a lubricating oil and the at least one member, separating the lubricating oil from the at least one member under normal temperature and normal pressure conditions, separating moisture to a full extent from a mixture consisting of the at least one member and air, and subjecting the mixture to photolytic reaction by irradiation with UV light, and separating and collecting the resultant halogen compound from the photolytic reaction product. An apparatus for carrying out the method is also described.

6 Claims, 9 Drawing Sheets

FIG. 2

PULL REACTION CALCULATION MODEL

METHOD AND APPARATUS FOR THE DECOMPOSITION AND RE-USE-AS-RESOURCE TREATMENT OF OZONE LAYER-DEPLETING SUBSTANCES BY APPLICATION OF UV LIGHT

BACKGROUND OF THE INVENTION

1. Field of the Invention

This invention relates to a system for the decomposition and re-use-as-resource treatments of CFCs bromine-containing halogenated fluorocarbons (hereinafter referred to as, halons), HCFCs and other ozone layer-depleting substances such as halogen-containing organic solvents. These substances including CFCs may be generically called ozone layer-depleting substances. More particularly, the invention relates to a method and apparatus for efficiently decomposing ozone layer-depleting substances by the use of UV light for the re-use of the resultant decomposition products as kinds of resources.

2. Description of The Prior Art

It has been generally accepted that CFC which has been used in freezers, refrigerators, air-conditioners and aerosols and also in washing of electronic parts or for dry cleaning is released in air and the thus released CFC rises up to the stratosphere wherein it is photodissociated by the action of sunlight and the resultant chlorine atoms destroy the ozone layer therewith. Moreover, it has been reported that the sectional area of infrared ray absorption per molecule of CFC is greater by approximately two orders of magnitude than that per $CO_2$ molecule and that the anathermal effect of the earth resulting from CFC is as great as 10,000 to 20,000 times that based on $CO_2$ per molecule.

To avoid this, it has been advocated to reduce the amount of CFC used. The current CFC-saving measures include a method for suppressing the release in air and a CFC alternating method. The release-suppressing method may be classified into (a) a collection and re-use method and (b) a decomposition method. The decomposition of once used CFC is believed to be a real measure. In fact, a variety of fluorocarbon decomposing methods have been studied up to now but have never been put into practice.

At the treaty conference of Montreal's Protocol in 1992, which is a regulation treaty for ozone layer-depleting substances, it was determined that the fundamental production of HCFC would be wholly abolished before 2020. On the other hand, although HFC does not contribute to destroying the ozone layer, it greatly influences the anathermal tendency of the earth. Accordingly, it is assumed that HFC will suffer some regulations in the future. Especially, HCFC22 has been employed in domestic air conditioners over approximately 20 years and has been currently manufactured in an amount of not less than 30,000 tons a year in Japan. The conversion of the HCFC into innoxious substances has been a serious problem to solve next to that of CFC. Accordingly, the conversion, into harmless substances, of HCFCs such as HCFC and HCF, will contribute to the conservation of the terrestrial environment.

We already proposed methods and apparatuses for continuously decomposing and separating ozone layer-depleting substances wherein a continuously feeding gaseous fluorocarbon is irradiated with UV light having a specific wavelength at which the highest decomposition rate can be attained so that the fluorocarbon is decomposed and the resultant reaction product and an unreacted fluorocarbon are continuously separated from each other through a separation membrane. These methods and apparatuses are particularly set out in Japanese Patent Laid-Open Publication No. 5-277205.

These patent applications deal with methods and apparatuses for continuously decomposing and separating ozone layer-depleting substances without resorting to any chemical treatment. However, any decomposition and re-use system has never been established wherein a variety of ozone layer-depleting substances used in various fields are collected or recovered and are subjected to continuous decomposition and separation treatment, after which the decomposed products are collected for re-use as a resource.

SUMMARY OF THE INVENTION

It is accordingly an object of the invention to provide a fluorocarbon-decomposing and re-using system which makes use of UV light whereby the system can be established for practical applications.

It is another object of the invention to provide a method and apparatus for continuously decomposing a variety of ozone layer-depleting substances without resorting to any specific chemical treatment under treating conditions close to normal pressures whereby the ozone layer-depleting substances are rendered harmless and the resultant decomposed products can be re-used as kinds of resources.

It is a further object of the invention to provide a method and apparatus for continuously decomposing a variety of ozone layer-depleting substances under good working conditions by a simple manner.

The above objects can be achieved, according to one embodiment of the invention, by a method for continuously decomposing ozone layer-depleting substances which comprises adding air serving as a photolytic reaction promoter to at least one member selected from the group consisting of CFCs, HCFCs, halons and halogen-containing organic solvents, subjecting the resultant mixture to irradiation with UV light, and separating the resultant solid product and the resultant halogen product from each other to render the at least one member harmless, characterized by providing a refrigeration medium comprising a lubricating oil and the at least one member, separating the lubricating oil from the at least one member under normal temperature and normal pressure conditions, separating moisture to a full extent from a mixture consisting of the at least one member and air, and subjecting the mixture to photolytic reaction using UV light, and separating and collecting the resultant halogen compound from the photolytic reaction product.

According to another embodiment of the invention, there is also provided an apparatus for continuously decomposing ozone layer-depleting substances wherein at least one member selected from the group consisting of CFCs, HCFCs, halons and halogen-containing organic solvents is provided and admixed with air serving as a photolytic reaction promoter and is then subjected to irradiation with UV light to separate the resultant solid product and a halogen product from each other to render the at least one member harmless, the apparatus comprises a gas-liquid separator for a refrigeration medium containing a lubricating oil and at the least one member wherein a lubricant oil is separated and removed from the at least one member under normal temperature and normal pressure conditions, a unit for feeding air added as a photolytic reaction promoter, a moisture separator for completely separating and removing moisture from the at least one member and the air which are, respectively, fed from the gas-liquid separator and the unit, a photolytic reactor having a UV light irradiator unit to which the fluorocarbon and air from which the moisture has been completely separated therefrom are supplied, a separator for separating a gaseous or liquid halogen compound formed by photolyric reaction from a reaction system, and a halogen collecting and storing unit wherein the separated halogen compound is collected and the at least one fluorocarbon continuously fed to the apparatus.

PREFERRED EMBODIMENTS OF THE INVENTION

In our Japanese Patent Applications set out hereinbefore, we proposed an optimum wavelength for decomposition of CFCs which is in the vicinity of 190 nm. We have now found that the low pressure mercury lamp used for the decomposition was not able to output a wavelength higher than 185 nm. Accordingly, there seems to be the high possibility that the wavelength at which the ozone layer-depleting substances can be most efficiently decomposed is not higher than 185 nm rather than not higher than 190 nm.

For example, the decomposition of optimum wavelength of the CFC12 becomes 169 nm when calculating (3-21G) the CFC12 using a non-experimental molecular orbital method (Gaussian 92, Gaussian, Inc.) capable of directly calculating the optimum wavelength for the photodissociation of CFCs.

The CFCs (CFC's) which are used for decomposition in the practice of the invention include, for example, CFC11 ($CCl_3F$), CFC12 ($CCl_2F_2$), CFC113 ($CCl_2F-CClF_2$), CFC114 ($CClF_2-CClF_2$), CFC115 ($CClF_2-CF_3$) and the like. The fluorocarbon analogues used in the invention include halons (1211: $CF_2ClBr$, 1301: $CF_3Br$, 2402: $CF_2BrCF_2Br$), HCFCs (22: $CHF_2Cl$, 123: $CHCl_2CF_3$; 141b: $CH_3CCl_2F$), alternate fluorocarbon HFC (134a: $CH_2FCF_3$), halogen-containing organic solvents (carbon tetrachloride, 1,1,1-trichloroethane, trichloroethylene), and the like.

It will be noted that when HFC is decomposed, it is necessary to use UV light having a wavelength different from that used for the other ozone layer-depleting substances.

For example, the optimum wavelength of the decomposition of HFC 134 becomes 102 nm when calculating (3-21G) the HFC134a using the non-experimental molecular orbital method. (Gaussian 92, Gaussian, Inc.).

According to the invention, lubricants which are contained in ozone layer-depleting substances to be treated and which have the possibility of generating harmful substances on irradiation with UV light are first separated and removed under normal temperature and normal pressure conditions. Then, the thus removed fluorocarbon is subjected a photolyric reaction wherein oxygen in the air is used as a photolytic reaction promoting substance or promoter. The use of air as an oxygen source is convenient from the standpoint of costs.

When moisture is present in a photolyric reactor, there is the high possibility that hydrogen fluoride, which is harmful to human body, will be produced during the course of the photolyric reaction. Accordingly, it is essential to introduce, into the reactor, a fluorocarbon and air from which moisture has been completely removed. Chlorine (as will be generated from ozone layer-depleting substances, 1,1,1-trichloroethane and the like) or bromine (as will be generated from specific halons) can be readily removed by a gas separator such as a gas separation membrane. The thus removed gas is collected and stored in a storing unit. On the other hand, the fluorine-containing powder which is produced through the photolyric reaction is solid in nature and can be separated in the photolytic reactor and collected in a collector unit.

The principle of the method according to the invention is based on the photodissociation reaction of halogen atoms such as of ozone layer-depleting substances caused by UV light occurring in the ozone layer. This photodissociation reaction is efficiently conducted in a reactor on the ground in the practice of the invention. Thus, the ozone layer-depleting substances can be rendered harmless according to the method of the invention.

Analyses and Prediction of Decomposition Reactions of Ozone layer-depleting substances With UV Light According to a Molecular Orbital Method In our previous Japanese patent application, the decomposition reaction of CFC through UV light was analyzed by calculation according to the molecular orbital method (PM3) using a personal computer, with the following predictions.

(i) It was found that when five CFC compounds and CFC radicals were calculated with respect to the bonding strengths of C—Cl, C—F and C—C bonds, the bonding energy was about 10 eV for the C—Cl bond, about 14.5 eV for the C—F bond and about 12 eV for the C—C bond irrespective of the types of five CFC compounds and CFC radicals (chlorine-dissociated radicals). If a limited wavelength of UV light would be used, it would be highly possible that the C—Cl bond alone which has the smallest bonding energy could be photodissociated (see Table 1).

(ii) In view of the potential curves of the photolytic decomposition (for Cl dissociation) of the five CFC compounds and the CFC radicals, the potentials of CFC compounds and CFC radicals are crossed with the chlorine dissociation curves in the vicinity of the minimal point of the respective excited states, revealing that the chlorine atoms can be dissociated by the action of UV light having a specific wavelength.

In the practice of the invention, as in the previously filed application, HCFC can be photolytically decomposed substantially at the same wavelength as used for CFC. The resultant gas is mainly composed of chlorine. This has been confirmed according to the molecular orbital method (calculated by (PM3)) (using softwares, MOPAC/386 (Version 6.0, made by Toray System Center, Inc.) for personal computers, and MOPAC Version 6.01 (Japanese Chemical Program Exchange System JCPE Program P015) for large computers.

The UV light reaction analyses and predictions made by us herein result in the following conclusion.

(i) Ozone layer-depleting substances undergo a common photolyric reaction.

Photolytic reactions have been investigated on specific halons, HCFCs, and halogen-containing organic solvents other than CFCs as shown in Table 2. It will be noted that although HFC134a and 1,1,1-trichloroethylene are not an ozone layer-depleting substance, they are checked for comparison. As a result, the ozone layer-depleting substances including the CFCs are assumed to undergo a common photolytic reaction.

a. The optimum wavelengths for the photolytic reaction are close to each other (see Tables 1 and 2).

TABLE 1

Excitation energies necessary for photolytic reaction* of specific ozone layer-depleting substances

| Kind of Specific Fluorocarbon | CFC11 ($CCl_3F$) | CFC12 ($CCl_2F_2$) | CFC113 ($CCl_2F$—$CClF_2$) | CFC114 ($CClF_2$—$CClF_2$) | CFC115 ($CClF_2$—$CF_3$) |
|---|---|---|---|---|---|
| Excitation Energy | 85.17 | 84.10 | 83.34 | 80.41 | 78.40 |

*Note: R → R· + Cl· (kcal/mol)

TABLE 2

| Fluorocarbon Analogues | | Structural Formula | Excitation Energy (kcal/mol) |
|---|---|---|---|
| Halon | 1211 | $CF_2ClBr$ | 73.23 |
| | 1301 | $CF_3Br$ | 64.86 |
| | 2402 | $CF_2BrCF_2Br$ | 74.64 |
| HCFC | 22 | $CHF_2Cl$ | 82.15 |
| HCFC | 123 | $CHCl_2CF_3$ | 68.42 |
| | 141b | $CH_3CCl_2F$ | 64.08 |
| HFC | 134a | $CH_2FCF_3$ | 163.82 |
| Organic Solvent | carbon tetrachloride | $CCl_4$ | 66.59 |
| | trichloroethane | $CH_3CCl_3$ | 73.20 |
| | trichloroethylene | $ClHC=CCl_2$ | 107.41 | b. The bromine atom is dissociated for the specific halons and the chlorine atom or atoms are dissociated for the CFCs, HCFC and the organic solvents.

c. The photodissociation potential curve intersects in the vicinity of the minimal point of $S_1$ (minimal excited singlet state) with the halogen atom dissociation potential curve at $T_1$ (minimal excitation triplet state), thereby causing the halogen atom or atoms to be dissociated.

d. It has been found that the HCF 134a checked for comparison suffers photolytic decomposition. The photodissociation reaction is such that the dissociation reaction of the C—C bond takes place, permitting direct dissociation from the state $S_1$. The optimal photolytic wavelength is at the side of a shorter wavelength which is about ½ of that for the ozone layer-depleting substances. In this sense, selection of another type of light source is necessary.

e. The photodissociation reaction of trichloroethylene which is performed for comparison is, in fact, a dissociation reaction of the C═C bond. The optical photolytic wavelength is shorter than that used for the ozone layer-depleting substances.

(ii) The specific halons and HCFC undergo a pull reaction for a specific type of atom by means of an oxygen atom radical etc.

Figure 2:
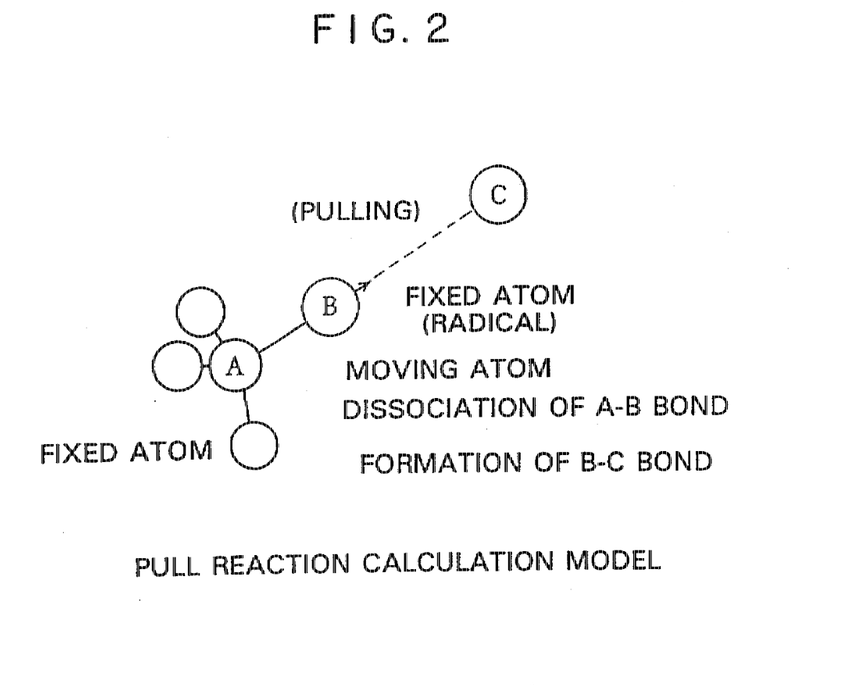
FIG. 2 is a schematic view showing an atom pull reaction model.

With respect to a specific halon and an HCFC, the calculation model of FIG. 2 was used to check the pull reaction for a specific type of atom by means of an oxygen atom radical or a chlorine atom radical. As a result, it was found that a specific halon and an HCFC underwent the pull reaction of the chlorine atom and the hydrogen atom from the molecule by means of the oxygen atom radical, chlorine atom radical or bromine atom radical, like the CFCs.

In view of the results of (i) and (ii) above, it has been found that the method of the invention is applicable not only to CFCs for rendering them harmless by the application of UV light (using oxygen as a reaction promoting gas), but also to other ozone layer-depleting substances for rendering them harmless by proper selection of a gas separation membrane and by application of UV light (using oxygen as a reaction promoting gas).

Embodiments of the invention are described with reference to the accompanying drawings. In these embodiments, the photolytic decomposition and re-use treatments are set out using typically a fluorocarbon or a fluorocarbon analogue unless otherwise indicated.

Figure 1:
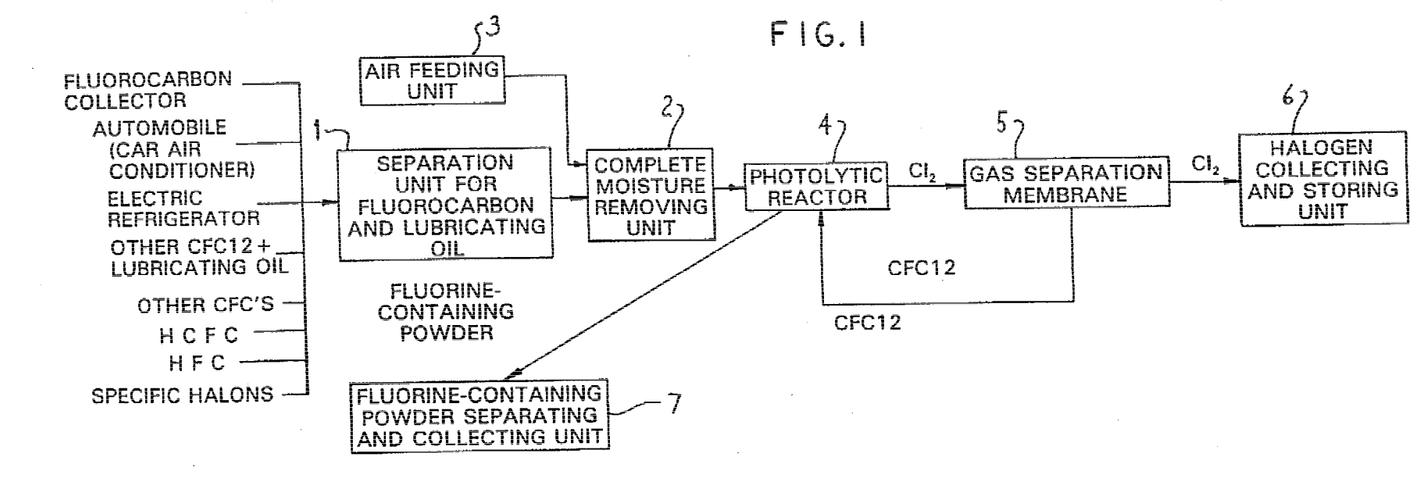
FIG. 1 is a flow chart showing a fluorocarbon-decomposing and re-using system according to an embodiment of the invention.

FIG. 1 shows a schematic view of a system for the decomposition and re-use-as-resource treatment of ozone layer-depleting substances by application of UV light.

Ozone layer-depleting substances collected from a variety of sources are each charged into a fluorocarbon-lubricating oil separator 1 wherein the lubricating oil is separated and removed therefrom. The thus separated fluorocarbon is passed to a complete moisture removing unit 2 in order to completely separate moisture from the fluorocarbon. The moisture serves as an inhibiting component for the decomposition with UV light. Air serving as a reaction promoting gas is introduced from an air feeder 3 into the moisture removing unit 3 wherein the moisture is completely removed from the air. The resultant fluorocarbon is charged into a photolyric reactor 4 wherein it is decomposed by UV light. The resultant gas mainly composed of chlorine gas is separated by means of a gas separation membrane 5 and the chlorine gas is collected in a halogen collecting and storing unit 6. It will be noted that with a halon, the bromine produced by the decomposition is liquid (boiling point 58.8° C.) and can be readily separated and collected from a gas and that any separation membrane is not necessary for the halon. On the other hand, an unreacted fluorocarbon (halon) separated with the gas separation membrane is passed to the photolytic reactor 4 and is again subjected to a photolytic reaction. The fluorine-containing powder formed by the photolyric reaction is collected in a fluorine-containing powder separation and collection unit 7.

(1) Complete separator 1 for separation between a fluorocarbon and a lubricating oil refrigeration mediums.

The refrigeration mediums used in car air conditioners and electric refrigerators are usually made of CFC12 and a lubricating oil at a ratio by weight of about 1:1. The lubricating oil is composed of a mineral lubricant containing an aromatic hydrocarbon.

(Reaction analyses and predictions for lubricating oils using a molecular orbital method)

The lubricating oils in compressors of electric refrigerators and car air conditioners are made of naphthenes, paraffins and aromatic compounds. Prior to experimental tests, the photolyric characteristics of individual components of naphthenic, paraffinic and aromatic lubricating oils are determined by calculation according to the molecular orbital method (PM3) using the aforeindicated large computer and a personal computer, with the following results.

a) The photoexcitation energy of the naphthenic and paraffinic lubricating oils (dissociation of the C—H bond) should have an energy which is not less than two times that at a wavelength of 185 nm which is the shortest wavelength of UV light from a low pressure mercury lamp (i.e. UV light having a wavelength as short as not larger than ½ of the wavelength of 185 nm). Accordingly, the photodissociation does not take place on irradiation with the low pressure mercury lamp.

b) On irradiation of aromatic lubricating oils with a low pressure mercury lamp at 185 nm, the C—H bond may be photodissociated. When the aromatic radicals and the chlorine radicals produced by photodissociation of CFCs are joined to each other, there is the likelihood that toxic compounds are produced. To avoid this, the lubricating oil has to be completely removed prior to introduction into the photolytic reactor 4.

Depending on the chemical structure, some aromatic hydrocarbons undergo photochemical reaction on exposure to UV light at a wavelength of a low pressure mercury lamp or at an optimum photolytic wavelength for CFC12 (benzene: 122.94 kcal/mol, toluene: 122.45 kcal/mol, iso-butylbenzene: 121.45 kcal/mol, naphthalene: 103.80 kcal/mol, β-iso-butylnaphthalene: 104.62 kcal/mol). When the aromatic hydrocarbons chemically react with the chlorine radicals produced during the photolytic reaction of CFC 12 or the oxygen atoms produced by the photolytic reaction of oxygen (reactor promoting gas), there is the great possibility of forming a number of compounds. Especially, chlorine-based harmful compounds such as dioxine, PCB and the like may be undesirably formed. Accordingly, the lubricating oil should be completely separated from CFC 12. The CFC 12 alone has to be introduced into the reactor.

(Structure of separator 1 for fluorocarbon and lubricating oil)

It has been found that when the mixture of CFC 12 and a lubricating oil is allowed to stand under normal temperature and normal pressure conditions, the CFC 12 alone can be taken out in the form of a gas owing to the difference in boiling point therebetween (i.e. boiling point of CFC 12: −29.79° C. and that of a lubricating oil: not lower than 250° C.). In this manner, pure CFC 12 can be introduced into the photolyric reactor 4 wherein it is rendered harmless. However, where CFC 12 alone is collected in the form of a gas at normal temperatures, about 5% of CFC 12 remains in the lubricating oil. The CFC 12 left in the lubricating oil is not chemically combined but only physically combined. In this condition, when the CFC 12-containing oil is allowed to stand at a temperature of 100° to 200° C. for approximately 2 hours, CFC 12 alone can be collected owing to the difference in the boiling point.

Figure 3:
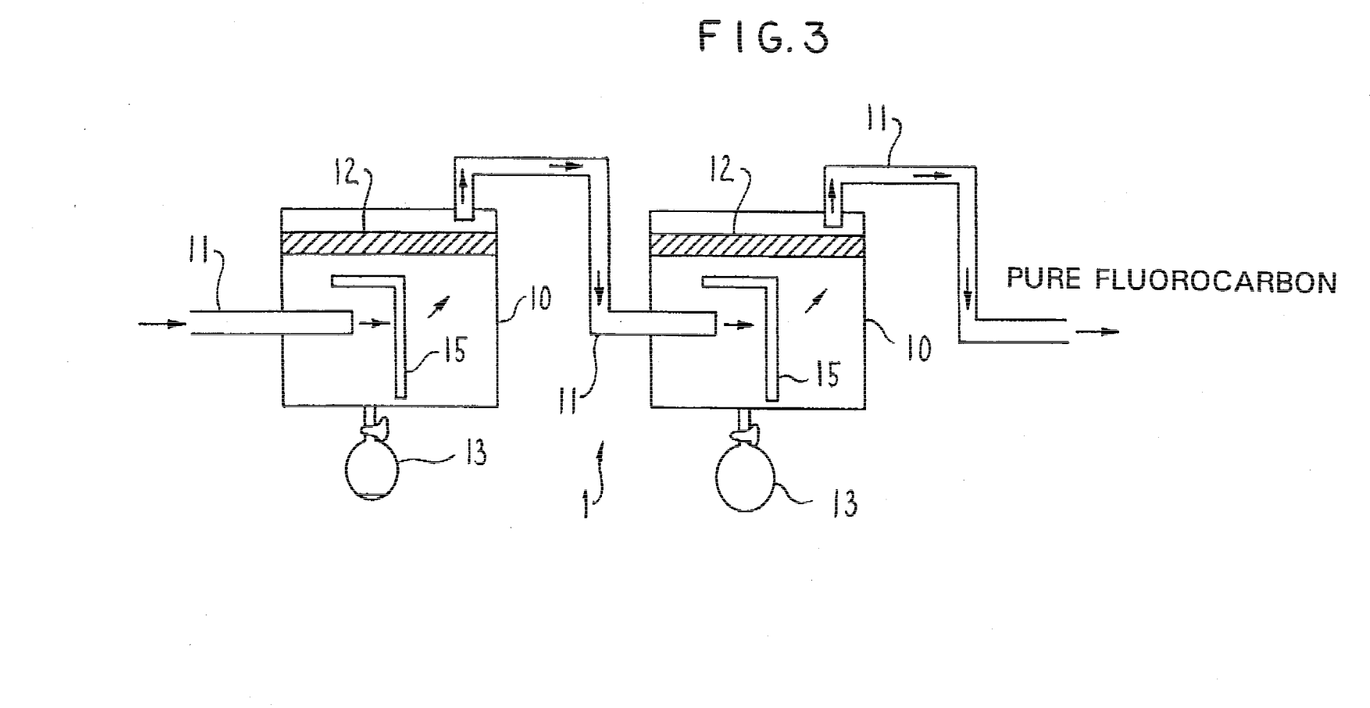
FIG. 3 is a schematic view showing a complete separator for a fluorocarbon and a lubricant oil used in an embodiment of the invention.

In order to make a practical separator, the separator 1 for a fluorocarbon and a lubricating oil should have multi-stage separation units 10 as shown in FIG. 3. The respective separation units 10 have, at an inlet thereof, a duct for introducing a refrigeration medium of car air conditioners or electric refrigerators collected by, for example, a fluorocarbon collector. The mixture of a fluorocarbon with a small amount of a lubricating oil mist is introduced from the duct 11 wherein the CFC 12 and the lubricating oil are separated from each other into each separation unit 10 operating under normal temperature and normal pressure conditions. The thus separated fluorocarbon is passed from an outlet of the separation unit 10 to an inlet of a next-stage separation unit 10 through a duct 11. The separation unit 10 has a felt-like filter 12 in the vicinity of its outlet, as shown, in order not to permit the mist of the lubricating oil to be entrained along with the fluorocarbon from the outlet thereof. On the other hand, the separated liquid lubricating oil is collected in a lubricating oil storing unit 13 provided at the bottom of the separation unit 10. In order to permit complete separation between the fluorocarbon and the lubricating oil, a baffle plate 15 may be provided at a position in face-to-face relation with the direction of blowing the mixture of the fluorocarbon and the lubricating oil from the inlet toward the inside of the separation unit 10. By this, the stream of the mixture introduced into the separation unit 10 is blown against the baffle plate 15 to prevent the lubricating oil from scattering. In this manner, the passage of the mixture of the fluorocarbon and lubricating oil through the multi-stage separation units 10 enables one to completely separate the fluorocarbon from the lubricating oil.

(2) Decomposition of ozone layer-depleting substances with UV light using air as a reaction promoting gas

For the decomposition of ozone layer-depleting substances by irradiation with UV light, oxygen is employed as a reaction promoting gas. Oxygen molecules undergo photolytic reaction on irradiation with UV light of 185 nm from a mercury lamp and are converted to oxygen atoms according to the following formula (1).

$$O_2 \rightarrow 2O. \tag{1}$$

The oxygen atoms bring about the pulling-out reaction of chlorine atoms from a fluorocarbon as shown in the following reaction formulas (2) and (3), thereby promoting the decomposition of the fluorocarbon. This has been confirmed according to the molecular orbital method which is a kind of calculation chemistry and also from the experiment using a 32 W low pressure mercury lamp for generating UV light of 185 nm (of the cold cathode type, made by Riko Science Co., Ltd., UV light of 185 nm with 1.4 W lamp, UV light of 254 nm with 7 W), and the result of which shows that the amount of chlorine produced by photodisoociation of CFC 12 is increased by about seven times by adding more than 10% oxygen).

Since oxygen in air is used, as it is, as a source for oxygen molecules, the apparatus of this embodiment can be designed in a simple and compact fashion. For instance, it becomes possible not to incorporate an oxygen cylinder or a PSA (pressure swing adsorption) device in the treating apparatus. It should be noted that no difference in the fluorocarbon decomposition speed between pure oxygen and air has been experimentally confirmed.

(Experiment for generating nitrogen oxides by irradiation of UV light in co-existence of air and a fluorocarbon)

The UV light at 185 nm generated from a low pressure mercury lamp is able to photolyrically decompose oxygen molecules, thereby generating oxygen atoms. Where air is used as a source of supply of oxygen, attention should be paid to whether or not oxygen atoms and nitrogen molecules react with each other to generate nitrogen oxide, which is harmful to the human body, according to the following reaction formula (4)

$$N_2 + O + nO_2 \rightarrow NO_x \quad (4)$$

Accordingly, the generation of nitrogen oxide or oxides had been checked experimentally and from the standpoint of the calculation chemistry. As a result, it has been found that the reactions of the above formulas (2), (3) and (4) take place in the reactor in the form of competitive reactions. Nevertheless, the reactions of the formulas (2) and (3) are predominant with the nitrogen oxide being formed only in very small amounts.

Air and a fluorocarbon was mixed and introduced into a UV reactor, followed by irradiation with UV light from two 32 W low pressure mercury lamps (of the cold cathode type, made by Riko Science Co., Ltd.). Thereafter, the amount of the resultant nitrogen oxides (NOx) was determined using a nitrogen oxide measuring instrument. The results are shown in Table 3 below.

TABLE 3

| Air (ml/minute) | CFC 12 (ml/minute) | Presence orf absence of UV irradiation | Concentration of NOx (ppm) |
|---|---|---|---|
| 1000 | 0 | no | 0 |
| 1000 | 0 | yes | 0 |
| 500 | 500 | no | 0 |
| 500 | 500 | yes | 0.2 |

In this manner, the maximal amount of NOx is 0.2 ppm, revealing that in the reaction of the mixture of air and the fluorocarbon by irradiation of UV light, the formation of NOx is of no problem.

(3) Complete moisture removing unit 2

Where a refrigeration medium is introduced into the photolytic reactor 4, moisture incorporated in the medium is essentially introduced. Moreover, when outside air is used as a reaction promoting gas, moisture is inevitably incorporated along with the air. If the moisture is not completely removed by means of a dehydrating device prior to introduction into the reactor 4, the additional and undesirable reactions of the following formulas (5) to (7) take place based on the moisture incorporated in the reactor.

$$H_2O \rightarrow H + OH \quad (5)$$

$$H_2O + O \rightarrow 2OH \quad (6)$$

$$CCl_2F_2 + H \rightarrow CCl_2F + HF \quad (7)$$

Especially, the reaction of the formula (7) leads to the formation of hydrogen fluoride (HF) which is harmful to the human body. In the presence of moisture, HF is converted to a hydrofluoric acid, which will etch glass walls of the reactor 4. Thus, HF is a dangerous chemical substance.

The photolyric reaction of the water molecule in the formula (5) is a hydrogen radical-forming reaction which is one of the factors of producing hydrogen fluoride. Further, the reaction of the formula (6) is a useless reaction which consumes oxygen atoms which serve as a promoter for the photolyric reaction of the fluorocarbon.

The complete moisture removing unit 2 in this embodiment is constituted by a multi-stage moisture-absorbing device (not shown) having a potential moisture-absorbing effect wherein a moisture-absorbing material is filled up in a fluorocarbon flow path and an air flow path located just prior to the photolytic reactor 4. The moisture-absorbing materials should be ones which have a great moisture-absorbing effect, harmless to the human body and simple in handling. Examples include zeolites, calcium chloride and the like. Thus, moisture is completely removed from the fluorocarbon from which the lubricating oil has been separated and removed and also from air used as a reaction promoting gas.

(4) Photolyric reactor 4 using UV light

Where the photolyric reactor 4 is a container made of glass, UV light from a UV light generating unit provided at the center of the container transmits through the glass and arrives at the outside. On the other hand, when the photolytic reactor 4 is a container made of a metal, a polymer or a ceramic material, UV light is absorbed in the container. Either the transmission or the absorption is one of the factors of lowering the energy efficiency in the photochemical reaction. The UV light transmitted through the glass container undesirably contributes to the formation of oxygen atoms or ozone, which is harmful to the human body, through the photolyric decomposition of the oxygen in air as shown in the following formulas (1) and (8)

$$O_2 \rightarrow 2O. \quad (1)$$

$$O_2 + O. \rightarrow O_3 \quad (8)$$

The glass-transmitted UV light may adversely influence the sight or optic nerves.

Figures 4A, 4B:
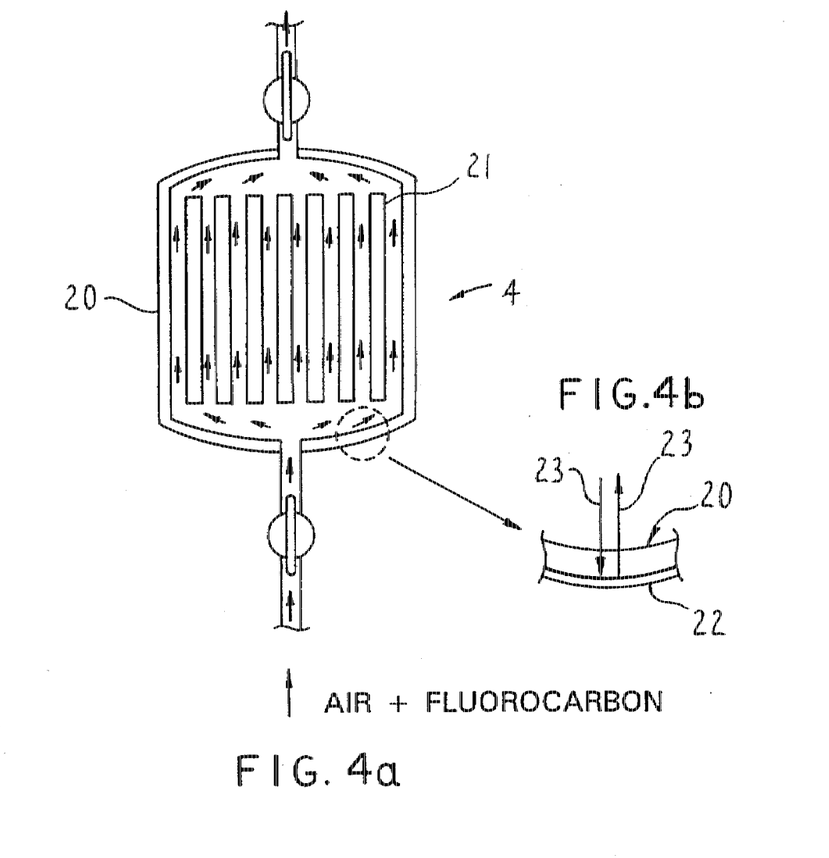
FIG. 4a is a schematic view showing a photolytic reactor used in an embodiment of the invention and FIG. 4b is an enlarged view showing a UV light reflecting film formed on the inner surface of the reactor.

In this embodiment, the photolyric reactor 4 is in the form of a reaction container 20 made of glass as shown in FIG. 4. The glass reaction container 20 has a plurality of UV lamps 21 therein. The container 20 is covered with a UV reflective film 22 on the periphery thereof. By this, UV Light 23 emitted from the UV lamps 21 is reflected at the reflective film 22, thereby increasing the energy efficiency in the photochemical reaction. In addition, harmful gases are prevented from generation and optic nerves are protected.

The UV light reflective film 22 may be coated on either an inner or outer side of the periphery of the glass reaction container 20. A preferable material for the reflective film includes a vacuum deposition film of aluminum because of its good reflectivity in the UV region (91.5% at a wavelength of 220 nm). The UV light reflective film 22 and the wall surfaces of the glass reaction container on which the reflective film 22 has been coated should be intimately contacted with each other. This is because where the reflective film 22 is coated on the outer wall surfaces of the glass reaction container 20 under which the reflective film 22 and the wall surfaces of the reaction container 20 have a space therebetween, the photochemical reaction of oxygen in air takes place. This results in an undesirable consumption of the UV light with the attendant generation of oxygen atoms and ozone which are harmful to the human body.

If the reflective film 22 is coated on the inner wall surfaces of the reaction container 20, the metal for the film 22 is formed with oxides or chlorides on the surface thereof by the action of the reaction products, such as oxygen atoms and chlorine radicals, thereby lowering the reflectivity.

When quartz, which has a lower UV absorption than other glasses, is used as the material to make the photolyric reactor 4, a substantial degree of UV absorption takes place in the surrounding glass, resulting in a loss of UV light. To avoid this, it is preferred to use LiF, $CoF_2$ and fused quartz which have little UV absorption.

The fluorocarbon decomposing and treating method in accordance with this embodiment is a treating method wherein ozone layer-depleting substances are rendered harmless by the use of a gas phase photochemical reaction. Where a cold cathode-type low pressure mercury lamp (made, for example, UVL-32LP by Riko Science Co., Ltd.) is used as a light source for the glass reaction container 20, several tens the lamps having a maximal wattage of 100 W are necessary. The lives of mercury lamps vary to an extent and these lamps have to be gradually replaced by fresh ones. To this end, a detaching and attaching system for exchanging UV lamps 21 with fresh ones which satisfies the following two requirements is necessary.

(1) The photolyric reaction container 20 is divided into a light source section which has the UV lamps 21 and a reaction container where no UV lamps 21 are provided and a mixed gas of a fluorocarbon and air are charged and discharged therefrom.

(2) A light source unit and a reaction container are independently provided, so that the replacement/attachment and detachment of UV lamps 21 of the light source is feasible without stopping the reaction during operation.

(3) The system is so designed to permit easy replacement/ detachment and attachment of UV lamps 21.

Figures 5A, 5B, 5C:
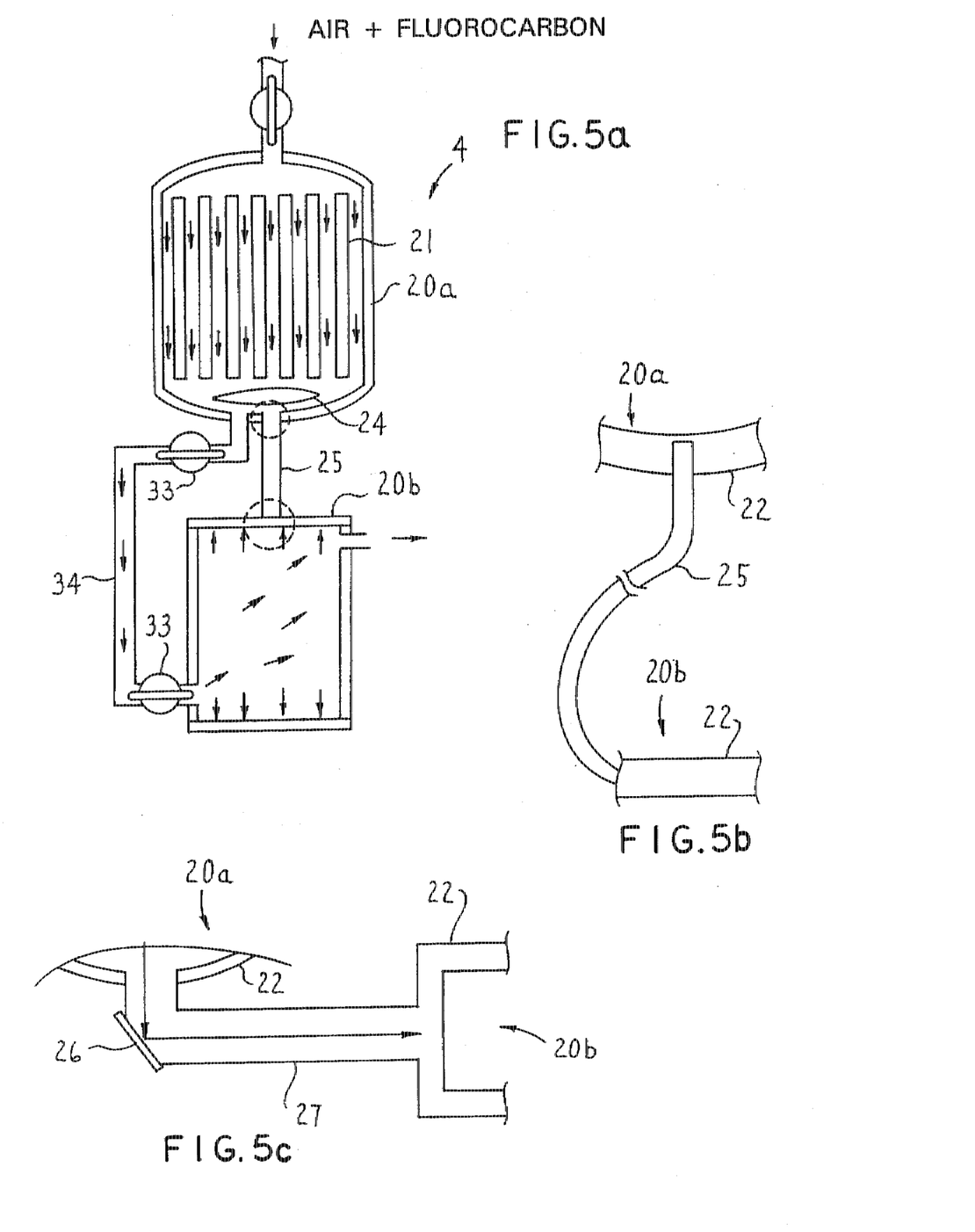
FIG. 5a is a photolytic reactor having a light source unit and a reactor unit which are separated from each other.
FIG. 5b is a schematic view showing an optical fiber connector between the light source unit and the reactor unit.
FIG. 5c is a schematic view showing another type of connector using a high reflection mirror.

To satisfy the above requirements, the photolytic reactor 4 of this embodiment is arranged, as shown in FIG. 5(a), to have a light source unit 20a and a reaction container 20b which are independent from each other. The light source unit 20a and the reaction container 20b are connected through an optical fiber cable 25 (FIGS. 5(a) and 5(b)) or through a high reflection mirror unit 26 (FIG. 5(c)). The light source unit is filled with nitrogen gas or the like which does not absorb light from the low pressure mercury lamp. The light source unit 20a has a condensing lens 24 in the vicinity of an outlet of the UV light, so that the UV light can be efficiently supplied to the reaction container 20b. The apparatus 4 schematically shown in FIG. 5(a) includes a light source unit 20a accommodating UV lamps 21, a reaction container 20b and an optical fiber cable 25 connecting the unit 20a and the container 20b therewith. As is, respectively, shown in enlarged views of the connections between the light source unit 20a and the reaction container 20b of FIGS. 5(b) and 5(c), the light source unit 20a made of synthetic quartz glass and the reaction container 20b are commonly coated with a highly reflective film 22 made of aluminum at the respective outer wall portions thereof. Thus, the UV light from the light source unit 20a is effectively passed toward the reaction container 20b and is uniformly reflected at the outer wall portions of the reaction container 20b. By this, the fluorocarbon decomposition reaction conditions in the reaction container 20b become uniform. FIG. 5(c) is a schematic enlarged view of the connector unit between the light source unit 20a and the reaction container 20b using a high reflection mirror 26. The UV light from the light source unit 20a is passed through the high reflection mirror 26 and a connection tube 27 to the reaction container 20b. The connection tube 27 is filled with nitrogen gas and made of a material, which does not absorb light from a low pressure mercury lamp, e.g. a metal or a fluorine resin.

Figures 6A, 6B:
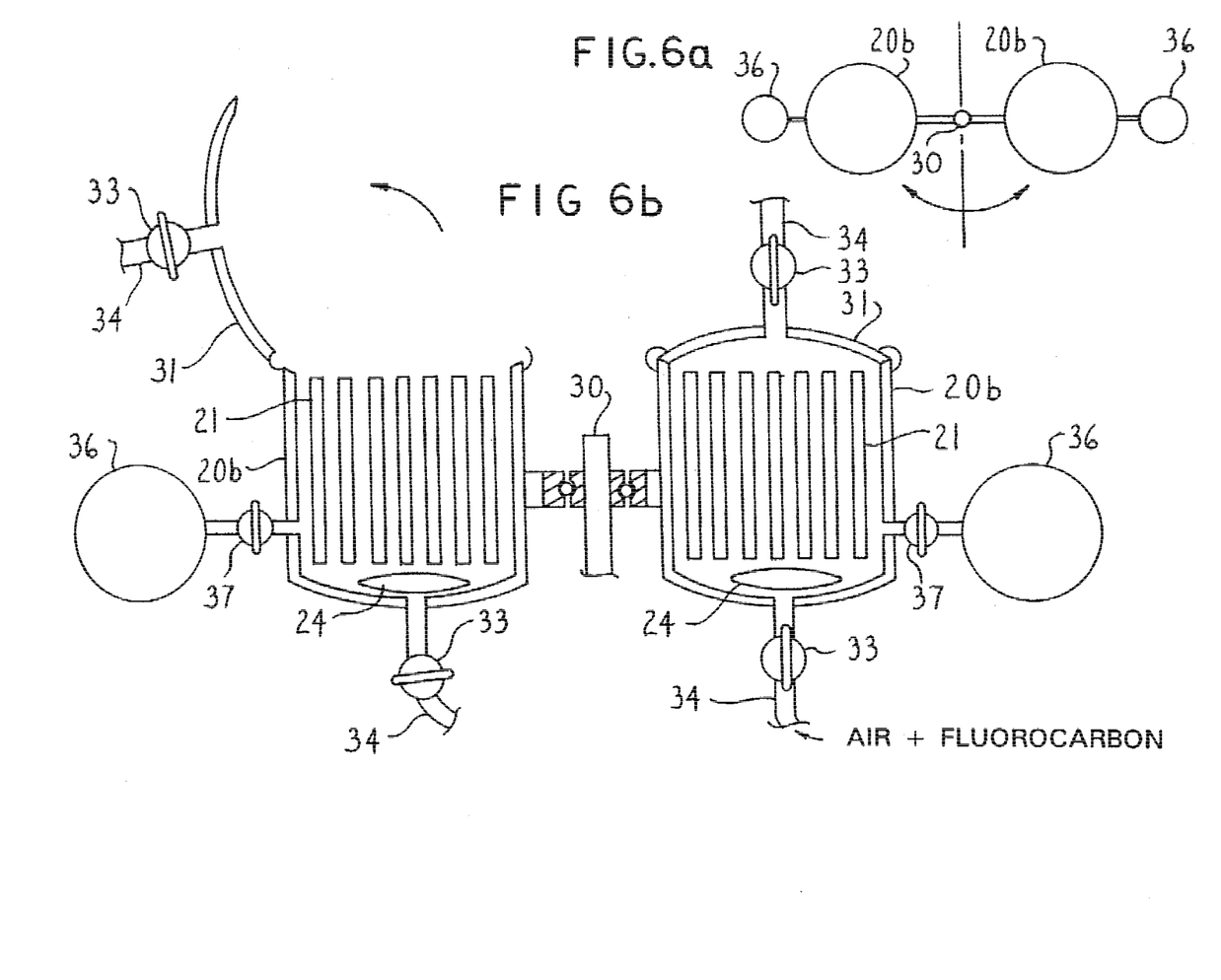
FIGS. 6a and 6b are, respectively, a top view and a side view, partially in section, of a photolytic reactor according to a further embodiment of the invention.

FIGS. 6(a) and 6(b) are, respectively, a plan view and a side view, partially in section, of the reaction container 20b (wherein the connection unit between the light source unit and the reaction container 20b is not shown). As shown, two reaction containers 20b are provided symmetrically about the axis of rotation 30. For replacement of the UV lamps 21, the two containers 20b, of which one is in operation and the other is a spare container, are 180° about the rotation axis 30. By this rotation, the spare container 20b is positioned in place of the container 20b whose lamps are to be replaced. Thus, the container 20b to be replaced is removed from the reaction system and a cover lid 31 is opened, after which the used lamps 21 are removed and replaced with fresh lamps 21. The individual UV lamps in the reaction container 20b are fixed by suitable means such as a combination of a spring and a screw (not shown). Thus, the quick replacement of the lamps 21 is possible. Thus, the replacement/detachment and attachment of the UV lamps 21 is possible without stopping the reaction during the time the photolytic reactor 4 is in operation.

When the apparatus has no spare reaction container 20b (as in FIG. 4(a)), a fluorocarbon is not photolytically decomposed during the course of the replacement of the UV lamps. Nevertheless, the apparatus is so arranged that an unreacted fluorocarbon is continuously fed back to the photolytic reactor 4 through the gas separation membrane 5. This allows the replacement of the lamps without stopping the operation.

In a conventional open reaction container (not shown), UV lamps are air-cooled. The open reaction container is so air-cooled that air is forcedly passed to cavity portions established among a plurality of UV lamps and also to the spaces between the peripheral wall surfaces of the reaction container and the UV lamps. In this arrangement, UV light is inevitably absorbed in the cooling air (oxygen) and, thus, UV light which should be passed to the reaction container is undesirably consumed. The oxygen absorbing UV light undergoes a photolytic reaction, part of which is converted to oxygen atoms or ozone. The air for air cooling which contains the oxygen atoms or ozone is released to the outside as it is. The oxygen atoms or ozone contained in the air is harmful to the human body even in very small amounts (e.g. 8 hours-working environment of ozone is at a level not higher than 0.1 ppm). In the reaction container, the oxygen atoms or ozone is a valuable chemical substance which promotes the decomposition of ozone layer-depleting substances.

With the photolytic reactor 4 of the type wherein the UV lamps 21 are accommodated in the reaction container 20, as shown in FIG. 4a, unlike the conventional open reaction container, the reaction container 20 is of the closed type as shown. No cavity portions are provided for cooling the UV lamps 21 in the reaction container 20. The UV lamps 21 are cooled by means of the fluorocarbon provided for the reaction and the moisture-removed air for assisting the reaction. This has the following advantages.

(1) Oxygen atoms or ozone which is harmful to the human body in very small amounts is not released to the outside.

(2) Oxygen atoms or ozone generated during cooling is fully used for the fluorocarbon treating reaction.

With the photolytic reactor 4 wherein the light source unit 20a and the reaction container 20b are connected with the optical fiber 25 or high reflection mirror 26 as shown in FIGS. 5(a) to 5(c), a cock is provided at the flow path for the mixed gas of air and a fluorocarbon which connects the light source 20a and the reaction container 20b as shown in FIG. 6(b). When the UV lamps 21 of the light source 20a are replaced by fresh ones, the gas flow path 34 is closed by means of the cock 33, under which the gas in the light source unit 20a is stored in a gas storing unit 36 attached to the light source unit 20a. The light source unit 20a is removed to outside of the photoreaction system, at which the used lamps 21 are removed and replaced by fresh ones. Then, the light source unit 20a is returned to the photoreaction system and the cock 33 of the gas flow path 34 and a cock 37 of the gas storing unit are opened to re-start the continuous reaction.

(6) Gas separation membrane 5

The gas separation membrane used in this embodiment is made, as set out in our previous Japanese Patent Laid-Open Publication No. 5-277205, of either of the following membranes.

(i) Silicone hollow fiber membranes (M-60, M-80 commercially available from Nagayanagi Industries, Ltd.)

(ii) Polyimide hollow fiber membranes (UM-A1, commercially available from Ube Industries Ltd.)

In the continuous method of this embodiment, the silicone hollow fiber membrane were higher in separability of chlorine gas than the polyimide hollow fiber membrane. When using the polyimide fiber hollow membrane, the separability increases on heating to approximately 150° C. Accordingly, it is preferred to use the polyimide hollow fiber membrane under heated conditions.

Figure 7:
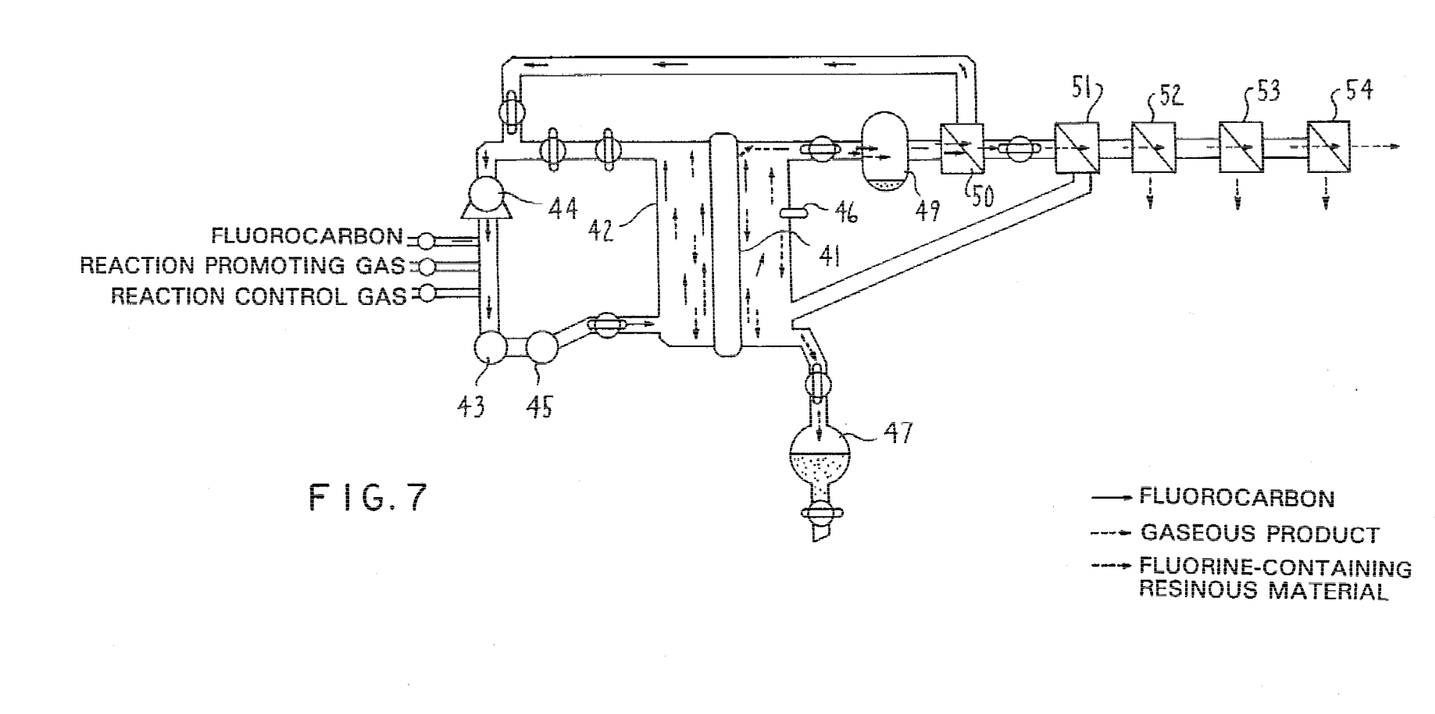
FIG. 7 is a schematic view showing a CFC decomposition reactor used in an example of the invention.

A continuous separation test using different types of hollow fiber membranes was conducted using a device of FIG. 7 wherein CFC 12 was continuously fed. In FIG. 7, indicated by 41 is a UV lamp, by 42 is a reaction column, by 43 is a vacuum pump, by 44 is a circulating pump, by 45 is a flowmeter, and by 46 is a thermometer. Reference numeral 47 indicates a liquid or solid reaction product reservoir, and reference numeral 49 indicates a solid product reservoir having a filter. Indicated by 50 is a gas separation membrane for separating a fluorocarbon from other gases, by 51 is a gas separation membrane for separating additive substances (e.g. a reaction promoting gas and a reaction control gas) and produced substances, both in the form of gases, and indicated by 52, 53 and 54 are, respectively, gas separation membranes for produced gases.

In the figure, the flow of the fluorocarbon is indicated by the solid line arrow (→). Likewise, the flow of gaseous products is indicated by the plain dotted line arrow (-->) and the flow of fluorine-containing resinous materials is indicated by the bold dotted line arrow (-->).

As will be seen from FIG. 7, CFC 12, a reaction promoting gas, $O_2$, and a reaction control gas, (for example, $N_2$ gas), are passed to the reactor 42 through the vacuum pump 43 and the flowmeter 45. In the reactor, the fluorocarbon is irradiated with the UV lamp 41. The liquid or solid product is passed to the reservoir 47 and the gaseous product containing CFC 12 left undecomposed is passed to the reservoir 49 and the gas separation membrane 50 wherein the undecomposed fluorocarbon is separated from the gas product. The undecomposed fluorocarbon is recycled by means of the circulating pump 44.

Using the device of FIG. 7 wherein a 32 W low pressure mercury lamp of the cold cathode type (commercially available from Riko Science Co., Ltd.) was used, the continuous decomposition and separation operations were conducted under the following conditions using different types of hollow fiber membranes.

Figure 8A:
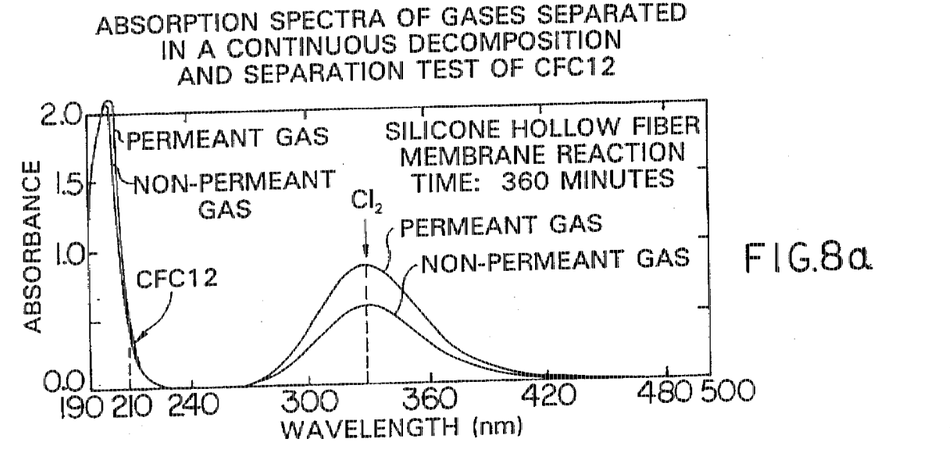
FIG. 8(a) to 8(c) are, respectively, graphs showing the absorption spectra of gases separated during a continuous decomposition and separation test of CFC 12 using a silicone hollow fiber membrane and a polyimide hollow fiber membrane under different reaction conditions.
Figure 8B:
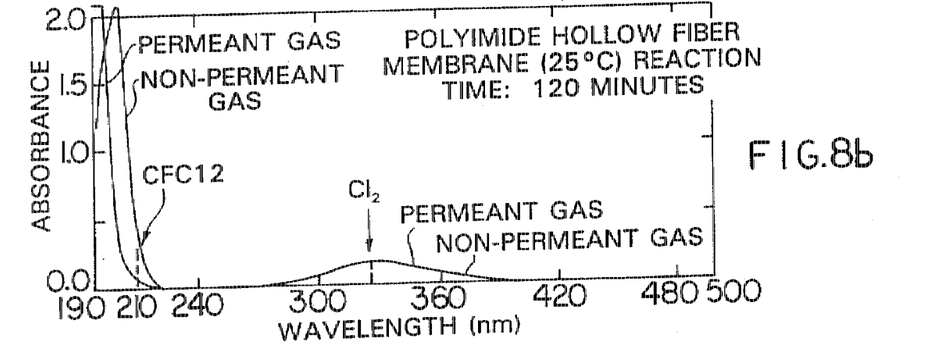
Figure 8C:
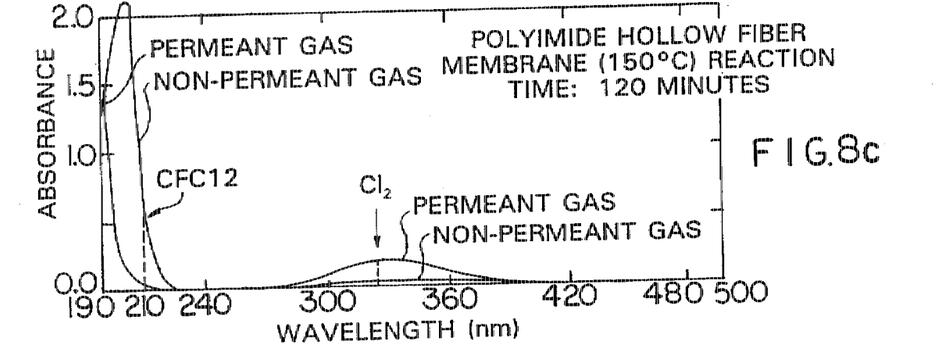

(i) Silicone hollow fiber membranes (M-60, M-80 of Nagayanagi Industries Ltd.)
UV intensity: 7 W (254 nm), 1.4 W (185 nm)
Photolytic system flow rate: 140 ml/minute
Flow rate of permeant gas being discharged: 12 ml/minute
Flow rate of CFC 12: 10 ml/minute
Flow rate of $O_2$: 10 ml/minute (ii) Polyimide hollow fiber membrane (UM-A1 of Ube Industries Ltd.)
UV intensity: 7 W (254 nm), 1.4 W (185 nm)
Photolytic system flow rate: 100 ml/minute
Flow rate of permeant gas being discharged: 10 ml/minute
Flow rate of CFC 12: 10 ml/minute
Flow rate of $O_2$: 10 ml/minute In FIG. 8(a) to 8(c), there are shown UV absorption spectra of a gas (i.e. a gas passed through a hollow fiber passage of the hollow fiber membrane) and a permeant gas (i.e. a gas permeating the film of the hollow fiber membrane). In Table 4, the degree of separation between the CFC 12 and $Cl_2$ gas is shown.

TABLE 4

| Hollow Fiber Membrane | Temperature of Separation membrane | Continuous Running Time | Degree of Chlorine Separation |
|---|---|---|---|
| silicone | 25° C. | 360 minutes | 1.22 |
| silicone | 25° C. | 360 minutes | 1.22 |
| polyimide | 25° C. | 120 minutes | 8.6 |
| polyimide | 150° C. | 120 minutes | 270 |

Figure 9:
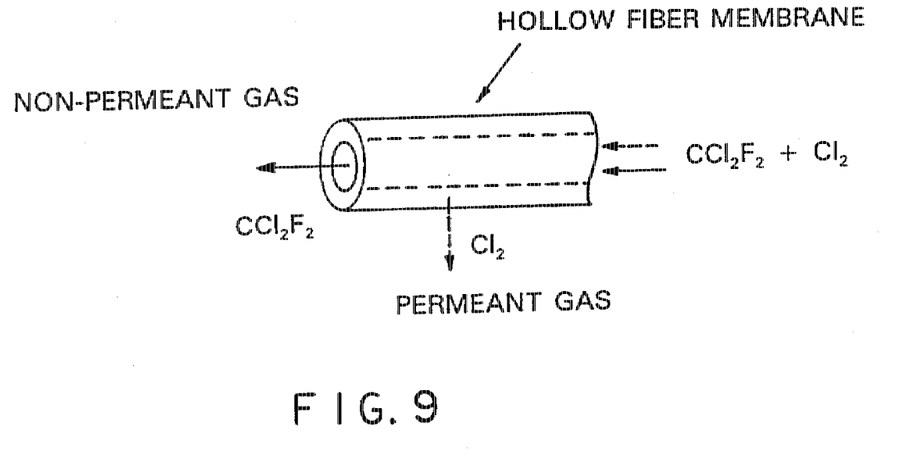
FIG. 9 is a schematic view showing the separation between CFC 12 and $Cl_2$ by use of a hollow fiber membrane.

As schematically shown in FIG. 9, the degree of separation between CFC 12 and $Cl_2$ of the hollow fiber membranes is calculated according to the following equation (1)

$$\text{Degree of separation of chlorine} = \frac{\text{concentration of permeant chloride gas}}{\text{concentration of permeant fluorocarbon gas}} \bigg/ \frac{\text{concentration of non-permeant chloride gas}}{\text{concentration of non-permeant fluorocarbon gas}} \quad (1)$$

360 minutes after commencement of the reaction, the UV absorption of the $Cl_2$ gas in the non-permeant gas and in the permeant gas is maximal at 330 nm for the silicone hollow fiber membrane, at which CFC 12 undergoes little separation and the $Cl_2$ gas is left in the reaction system in large amounts with the degree of separation being not high. With the polyimide hollow fiber membrane, the maximum values of the UV absorption of the $Cl_2$ gas in the non-permeant gas and the permeant gas are at the same level as is particularly shown in FIG. 8(b), meaning that CFC 12 is left only in small amounts in the non-permeant gas.

When the polyimide hollow fiber membrane is heated to 150° C., the degree of separation becomes as high as 270. As will be seen from FIG. 8(c), $Cl_2$ is contained in larger amounts in the permeant gas, in which little CFC 12 is present. Accordingly, it is considered best to use a polyimide hollow fiber membrane heated to 150° C. in an atmosphere containing oxygen for the continuous decomposition of CFC and also for the continuous separation of $Cl_2$. When the above process is used in combination with a deep cold gas separation method, it will be possible to separate Cl2 gas from a mixed gas at a purity of 99%.

(7) Halogen collecting and storing unit 6

The main product obtained by the fluorocarbon decomposition and re-use treatment using UV light consists of chlorine gas or bromine. The chlorine gas is industrially useful but is noxious to the human body (the 8 hours working environment of chlorine gas has been regulated in Japan as being at a level not higher than 0.5 ppm). Accordingly, it is necessary to provide a device for safely, reliably collecting and storing the chlorine gas separated from an unreacted fluorocarbon gas by means of the gas separation membrane 5. Halogen collecting and storing unit 6 is the device in the same manner as the principle of a fluorocarbon collecting machine for car air conditioners.

More particularly, the chlorine gas is compressed by means of a compressor to provide a high temperature and high pressure gas. The thus compressed halogen gas is allowed to cool in a condenser to provide liquid chlorine, followed by collection and storage in a cylinder in the form of a liquid. In this manner, the reason why the principle of a fluorocarbon collecting machine for car air conditioners (or, in some cases, the collecting machine itself) is applicable is that the CFC 12 has a boiling point very close to that of chlorine.

(8) Separation and collection device 7 for fluorine-containing powder

The fluorine-containing powder formed by the polymerization of reaction intermediates is moved within the reactor along with a gas fluent. A felt filter and a reservoir for fluorine-containing powder dropped from the filter (i.e. the fluorine-containing powder separator 7) is provided prior to the gas separation membrane 5, so that the fluorine-containing powder is separated and collected from the gas fluent. Another reservoir (not shown) for fluorine-containing powder is provided below the reaction container 20, with which the powder is collected.

(9) Decomposition and re-use treatment apparatus for ozone layer-depleting substances in foamed materials The annual amount of foaming CFC arrives at about 40,000 tons, which corresponds to 25% of the overall amount of CFC in Japan. With respect to the kinds of ozone layer-depleting substances, CFC11 amounts to about 25,000 tons per year and CFC 12 amounts to about 12,000 tons a year (in 1988). The ozone layer-depleting substances present in the used foamed materials are released in the air when crushed. Alternatively, when such foamed materials are allowed to stand as they are or are used for land-fill, the materials suffer gradual degradation with the attendant release of the fluorocarbon contained therein. To avoid this, the fluorocarbon in the used, foamed materials has to be treatmented to render it harmless. Because the used foamed materials are collected one by one in small amounts, it is reasonable to subject the material to treatment at collection centers.

The fluorocarbon is collected in a receiver by compressing foamed materials only by a compression force at temperatures close to normal temperatures such as by electrohydraulic devices thereby permitting the fluorocarbon to be released and then to be collected by a fluorocarbon collector. The thus collected fluorocarbon is charged into a fluorocarbon decomposition and re-use apparatus using UV light and is thus rendered harmless. The compression of the foamed material is advantageous in that the matrix material of the foamed material can be reduced in volume.

As stated hereinabove, according to the embodiments of the invention, small amounts of refrigeration mediums used in and individually collected from electric refrigerators, car air conditioners and domestic air conditions are collected. The ozone layer-depleting substances contained in the collected mediums can be readily photolytically decomposed into innocuous substances which are re-usable as kinds of resources. The system of this embodiment involves no chemical treatment step and is able to treat ozone layer-depleting substances under conditions close to normal temperature and normal pressure conditions. Moreover, the apparatus is a fully-automatic, continuous treating apparatus and is good at working properties. Nevertheless, the apparatus can be provided as being portable and simple in construction Thus, according to the invention, a system of continuously decomposing ozone layer-depleting substances for re-reuse of decomposition products as resources can be established.

What is claimed is:

1. In an apparatus for continuously decomposing a halogenated organic compound by a photolytic reaction in a reactor in which the halogenated organic compound is mixed with air as a photolytic reaction promoter and then subjected to UV radiation to decompose the halogenated organic compound, the improvement characterized in said apparatus comprising: means for continuously feeding a refrigeration medium containing a lubricating oil and a halogenated organic compound to a separation unit; a separation unit for separating the halogenated organic compound from the refrigeration medium under standard temperature and pressure conditions, said separation unit comprising two separation members in fluid communication with one another, each of said separation members having a baffle provided therein for separating the halogenated organic compound from the lubricating oil; a moisture separator for receiving air and the separated halogenated organic compound and removing moisture therefrom to form a dried air and halogenated organic compound mixture; means for introducing air into said moisture separator; a photolytic reactor for conducting a photolytic reaction with the dried air and halogenated organic compound mixture and forming a reaction mixture containing a separated halogen compound, said photolytic reactor comprising a reaction chamber having a plurality of UV lamps provided therein and a UV reflective film provided on the outer periphery thereof; a separator for separating the halogen compound from the reaction mixture; and a halogen collecting and storing unit for receiving the separated halogen compound.

2. The apparatus of claim 1, wherein said photolytic reactor is made of a material selected from the group consisting of LiF, CoF2 and fused quartz.

3. In an apparatus for continuously decomposing a halogenated organic compound by a photolytic reaction in a reactor in which the halogenated organic compound is mixed with air as a photolytic reaction promoter and then subjected to UV radiation to decompose the halogenated organic compound, the improvement characterized in said apparatus comprising: means for continuously feeding a refrigeration medium containing a lubricating oil and a halogenated organic compound to a separation unit; a separation unit for separating the halogenated organic compound from the refrigeration medium under standard temperature and pressure conditions, said separation unit comprising two separation members in fluid communication with one another, each of said separation members having a baffle provided therein for separating the halogenated organic compound from the lubricating oil; a moisture separator for receiving air and the separated halogenated organic compound and removing moisture therefrom to form a dried air and halogenated organic compound mixture; means for introducing air into said moisture separator; a photolytic reactor for conducting a photolytic reaction with the dried air and halogenated organic compound mixture and forming a reaction mixture containing a separated halogen compound, said photolytic reactor comprising a light source means, a reaction chamber in which the photolytic reaction takes place and light transmitting means connecting said light source means and said reaction chamber, a separator for separating the halogen compound from the reaction mixture; and a halogen collecting and storing unit for receiving the separated halogen compound.

4. The apparatus of claim 3, wherein said light transmitting means consists of an optical fiber cable.

5. The apparatus of claim 3, wherein said light transmitting means consists of a connection pipe filled with nitrogen gas and a reflection mirror for reflecting UV light from said light source unit toward said reaction chamber.

6. In an apparatus for continuously decomposing a halogenated organic compound by a photolytic reaction in a reactor in which the halogenated organic compound is mixed with air as a photolytic reaction promoter and then subjected to UV radiation to decompose the halogenated organic compound, the improvement characterized in said apparatus comprising means for continuously feeding a refrigeration medium containing a lubricating oil and a halogenated organic compound to a separation unit; a separation unit for separating the halogenated organic compound from the refrigeration medium under standard temperature and pressure conditions, said separation unit comprising two separation members in fluid communication with one another, each of said separation members having a baffle provided therein for separating the halogenated organic compound from the lubricating oil; a moisture separator for receiving air and the separated halogenated organic compound and removing moisture therefrom to form a dried air and halogenated organic compound mixture; means for introducing air into said moisture separator; a photolytic reactor for conducting a photolytic reaction with the dried air and halogenated organic compound mixture and forming a reaction mixture containing a separated halogen compound, said photolytic reactor comprising a pair of reaction chambers, each of said reaction chambers containing UV lamps and being interchangeably rotatable 180 degrees about an axis of rotation between a first position at which the photolytic reaction is conducted in a reaction chamber and a second position at which a reaction chamber can be serviced, thereby enabling the photolytic reaction to be conducted continuously; a separator for separating the halogen compound from the reaction mixture; and a halogen collecting and storing unit for receiving the separated halogen compound.

\* \* \* \* \*